US012392497B2

(12) United States Patent
Cowan

(10) Patent No.: US 12,392,497 B2
(45) Date of Patent: Aug. 19, 2025

(54) OVEN DOOR ALERT

(71) Applicant: Midea Group Co., Ltd., Foshan (CN)

(72) Inventor: Richard W. Cowan, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 538 days.

(21) Appl. No.: 17/851,784

(22) Filed: Jun. 28, 2022

(65) Prior Publication Data

US 2023/0417418 A1 Dec. 28, 2023

(51) Int. Cl.
*F24C 7/08* (2006.01)
*F24C 3/12* (2006.01)
*F24C 15/02* (2006.01)
*G08B 21/18* (2006.01)

(52) U.S. Cl.
CPC .............. *F24C 7/085* (2013.01); *F24C 3/128* (2013.01); *F24C 15/02* (2013.01); *G08B 21/18* (2013.01)

(58) Field of Classification Search
CPC ........ F24C 15/022; F24C 3/126; F24C 7/085; F24C 3/128; F24C 15/02; F24D 2700/02; F24D 29/008; G08B 21/18
USPC .......................... 126/197, 191, 192; 219/724
See application file for complete search history.

(56) References Cited

U.S. PATENT DOCUMENTS 4,345,144 A 8/1982 Bergquist
5,070,319 A * 12/1991 Scuka .................... G08B 21/18 340/391.1
6,295,004 B1 * 9/2001 Burnett ................... F24C 15/02 340/689
7,040,674 B2 5/2006 Lomicka et al.
7,728,711 B2 6/2010 Shoenfeld
8,327,835 B2 12/2012 Larsen et al.
8,514,084 B2 8/2013 Yi
8,800,544 B2 8/2014 Newsom et al.
9,161,650 B2 10/2015 Wood
(Continued)

FOREIGN PATENT DOCUMENTS

CN 208388192 U 1/2019
DE 112011104388 T5 9/2013
(Continued)

OTHER PUBLICATIONS

Patil et al., Internet of Things Based Integrated Smart Home Automation System, SSRN Electronic Journal; International Conference on Communication and Information Processing, www.researchgate.net/publication/342863089, 10 pages, dated Jan. 2020.
(Continued)

*Primary Examiner* — Steven B McAllister
*Assistant Examiner* — Amy E Carter
(74) *Attorney, Agent, or Firm* — Gray Ice Higdon

(57) ABSTRACT

A cooking apparatus includes a control circuit configured to generate an alert in response to sensed movement of an oven door. In some instances, the alert may be audible, and in some instances, the alert may be generated in response to movement of the oven door prior to receiving any user input through a user interface of the cooking apparatus. In some instances, the alert may be generated in response to movement of the oven door away from a closed position without returning to the closed position within a preset period of time.

19 Claims, 4 Drawing Sheets

(56) References Cited

U.S. PATENT DOCUMENTS

| | | | | |
|---|---|---|---|---|
| 9,396,599 | B1 | 7/2016 | Malhorta | |
| 9,404,287 | B2 * | 8/2016 | Lepie | E05B 43/00 |
| 9,677,771 | B2 | 6/2017 | Armstrong et al. | |
| 9,754,432 | B2 | 9/2017 | Bender et al. | |
| 10,084,783 | B2 | 9/2018 | Dubman et al. | |
| 10,482,756 | B2 | 11/2019 | Kumar et al. | |
| 10,825,311 | B2 | 11/2020 | Taylor et al. | |
| 10,829,959 | B2 | 11/2020 | Lowder | |
| 2005/0284460 | A1 | 12/2005 | Fitzsimons et al. | |
| 2013/0146581 | A1 * | 6/2013 | Donarski | F24C 7/087 219/412 |
| 2016/0076776 | A1 | 3/2016 | Gardner et al. | |
| 2018/0095439 | A1 | 4/2018 | Karbasian et al. | |
| 2018/0158288 | A1 * | 6/2018 | Logan | G08B 25/10 |
| 2021/0348435 | A1 * | 11/2021 | Ivanovic | G01P 15/18 |
| 2022/0065457 | A1 * | 3/2022 | Bailey | H05B 6/062 |
| 2022/0151431 | A1 * | 5/2022 | Lindsey | H05B 6/6447 |
| 2022/0214111 | A1 * | 7/2022 | Gibson | F27D 1/0033 |
| 2023/0258398 | A1 * | 8/2023 | Hu | F25D 29/008 340/686.1 |
| 2024/0003550 | A1 | 1/2024 | Cowan | |

FOREIGN PATENT DOCUMENTS

| | | | |
|---|---|---|---|
| DE | 102017111166 | A1 | 11/2018 |
| EP | 2885679 | A1 | 6/2015 |
| EP | 3112757 | A1 | 1/2017 |
| WO | 2010070399 | A2 | 6/2010 |

OTHER PUBLICATIONS

Jabbar et al., Design and Fabrication of Smart Home with Internet of Things Enabled Automation System, IEEE Access, 16 pages, dated 2017.

Related Applications Transmittal dated Jul. 6, 2022.

Gregory A. Wilson, United States Patent and Trademark Office, Non-Final Office Action issued in U.S. Appl. No. 17/853,164, 10 pages, dated Aug. 1, 2024.

* cited by examiner

OVEN DOOR ALERT

BACKGROUND

Cooking appliances such as ovens, ranges, cooktops, etc. are typically located in a kitchen in locations that are accessible to all individuals in a residence. Ranges, for example, may include both an oven and a cooktop. A cooktop is generally located on the top surface of the range housing and is accessible to anyone of the requisite height to reach the cooking elements and controls. An oven generally includes an oven cavity that is disposed within the range housing and that is typically accessible via a door that provides external access to the oven cavity.

An oven door is generally pivotable about a bottom hinge and is frequently located on the face of the cooking appliance that will be most frequently viewed by users and is operable by anyone of the requisite ability to move the door. The oven cavity is typically accessible at all times by opening the door. The door may be movable from a closed position to an open position, or an open position to a closed position.

It has been found that due to both the height and the bottom hinged configuration of an oven door, it may be possible for young children or even pets to open an oven door in some circumstances, even if the oven is currently on and the oven cavity is at a cooking temperature. While some aftermarket locks are commercially available for locking oven doors, such locks are generally unsightly and cumbersome to use, are only useful when a user remembers to activate the lock, and may be operated by children without parents being aware.

Accordingly, a significant need exists in the art for a manner of addressing inadvertent oven door openings in a cooking appliance.

SUMMARY

The herein-described embodiments address these and other problems associated with the art by providing an oven alert having functionality for determining whether a door of the oven has been moved and providing, in response to a determination that the door has been moved, an alert to users. In some instances, the alert may be audible, and in some instances, the alert may be generated in response to movement of the oven door prior to receiving any user input through a user interface of the cooking apparatus. In some instances, the alert may be generated in response to movement of the oven door away from a closed position without returning to the closed position within a preset period of time.

Therefore, consistent with one aspect of the invention, a cooking apparatus may include a housing, an oven cavity disposed within the housing, one or more cooking elements configured to heat the oven cavity, a door coupled to the housing, where the door is movable from a closed position to an open position to provide external access to the oven cavity, a sensor configured to sense movement of the door in relation to the housing, a user interface configured to receive user input, and a control circuit coupled to the sensor and the user interface. The control circuit may be configured to process user input received by the user interface and to detect movement of the door with the sensor. The control circuit may be further configured to generate an alert in response to detecting movement of the door with the sensor prior to receiving user input through the user interface.

In some embodiments, the control circuit is configured to generate the alert without modifying a cooking state of the cooking apparatus. Further, in some embodiments, the control circuit is configured to modify a cooking state of the cooking apparatus in connection with generating the alert. In some embodiments, the control circuit is configured to generate the alert irrespective of whether the one or more cooking elements are powered on or powered off.

Moreover, in some embodiments, the control circuit is configured to communicate the alert to a remote device. Further, in some embodiments, the remote device is a mobile device and the alert is a message presented on the mobile device. In some embodiments, the remote device is an assistant device, and the alert causes the assistant device to broadcast a message to a user. Also, in some embodiments, the alert causes the remote device to communicate a command to the cooking apparatus.

Moreover, in some embodiments, the control circuit is configured to delay the alert for a preset period of time after detecting movement of the door with the sensor prior to receiving user input through the user interface. In addition, in some embodiments, the control circuit is configured to terminate the alert in response to detecting closing of the door with the sensor. Also, in some embodiments, the alert is an audible alert.

Consistent with another aspect of the invention, a cooking apparatus may include a housing, an oven cavity disposed within the housing, one or more cooking elements configured to heat the oven cavity, a door coupled to the housing, where the door is movable from a closed position to an open position to provide external access to the oven cavity, a sensor configured to sense movement of the door in relation to the housing, and a control circuit coupled to the sensor. The control circuit may be configured to detect movement of the door with the sensor, the control circuit further configured to generate an alert in response to detecting movement of the door away from the closed position, without returning to the closed position within a preset period of time, with the sensor.

In some embodiments, the control circuit is configured to generate the alert without modifying a cooking state of the cooking apparatus. In addition, in some embodiments, the control circuit is configured to modify a cooking state of the cooking apparatus in connection with generating the alert. Also, in some embodiments, the control circuit is configured to generate the alert irrespective of whether the one or more cooking elements are powered on or powered off.

In some embodiments, the control circuit is configured to communicate the alert to a remote device. Moreover, in some embodiments, the remote device is a mobile device and the alert is a message presented on the mobile device. In some embodiments, the remote device is an assistant device, and the alert causes the assistant device to broadcast a message to a user. Also, in some embodiments, the alert causes the remote device to communicate a command to the cooking apparatus.

In addition, some embodiments may further include a user interface configured to receive user input, the user interface being coupled to the control circuit and the sensor, where the control circuit is further configured to process user input received by the user interface and to provide the alert in response to detecting movement prior to receiving user input from the user interface. Moreover, in some embodiments, the alert is an audible alert.

Consistent with another aspect of the invention, a cooking apparatus may include a housing, an oven cavity disposed within the housing, one or more cooking elements configured to heat the oven cavity, a door coupled to the housing, where the door is movable from a closed position to an open position to provide external access to the oven cavity, a sensor configured to sense movement of the door in relation to the housing, a user interface configured to receive user input, and control circuit coupled to the sensor and the user interface, the control circuit configured to process user input received by the user interface and to detect movement of the door with the sensor, the control circuit further configured to generate an audible alert in response to detecting movement of the door with the sensor.

These and other advantages and features, which characterize the invention, are set forth in the claims annexed hereto. For a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
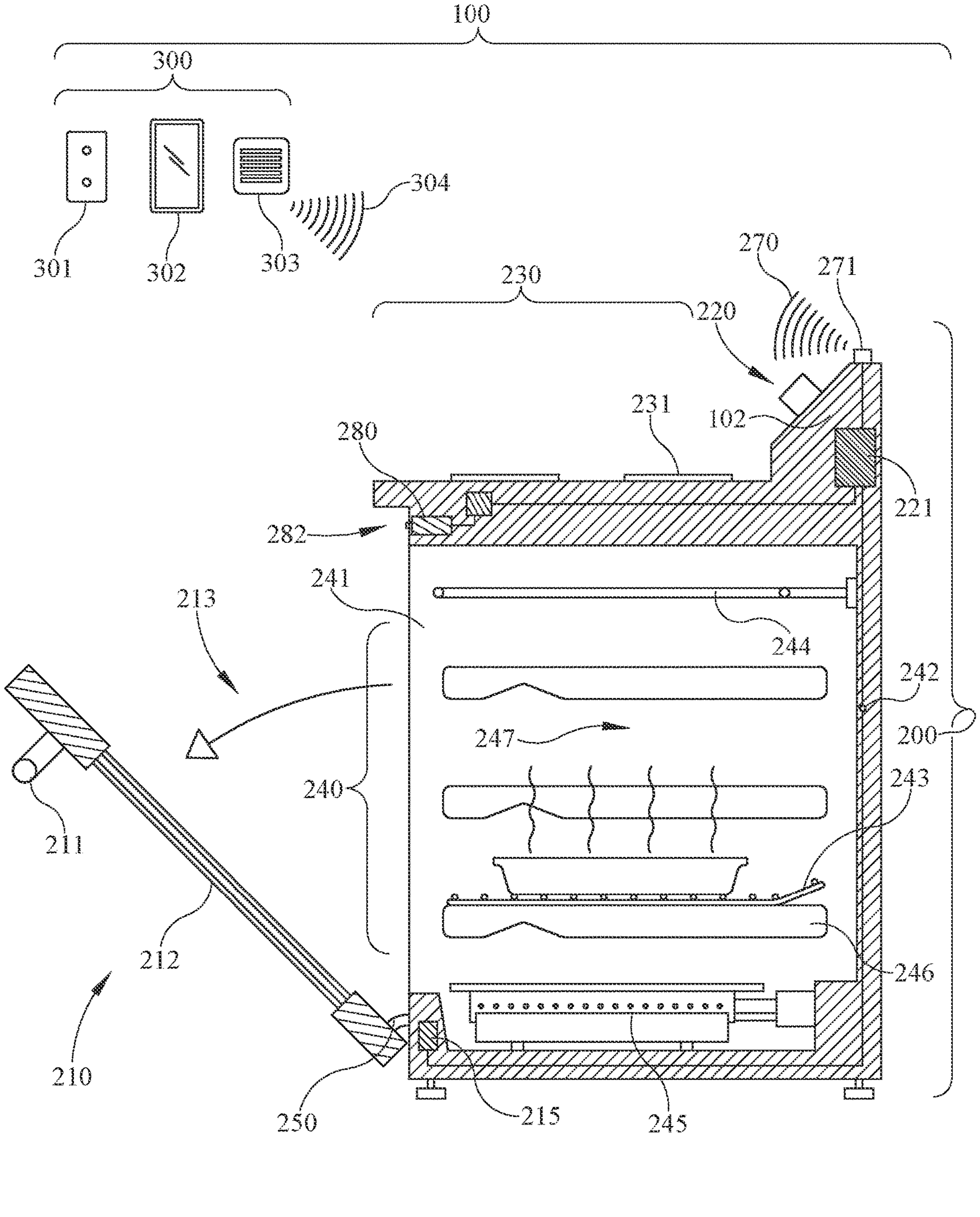
FIG. 1 is a cross sectional view of a cooking apparatus consistent with some embodiments of the invention, and with the door open.

The embodiments discussed hereinafter are directed in part to a cooking apparatus with a control circuit configured to generate an alert when an oven door has been moved. In some embodiments, the alert may be audible, and in some instances, the alert may be generated in response to movement of the oven door prior to receiving any user input through a user interface of the cooking apparatus. In some embodiments, a particular control or combination of controls of the user interface that the user input may be applied to may be configured by the user in the oven settings or may be fixed in the control circuit. In some embodiments, the entire alert system may be enabled or disabled for those users who do not desire to use it.

In some instances, the alert may be generated in response to movement of the oven door away from a closed position without returning to the closed position within a preset period of time. By doing so, users may be alerted as to instances where an oven door has perhaps been inadvertently been moved.

In some embodiments, some or all of the components used by the control circuit to generate an alert may be integrated into a cooking apparatus. In some embodiments, some or all of the components used by the control circuit to generate an alert may be distinct from a cooking apparatus and may be provided, for example, as an aftermarket addition, yet may still be considered to be integrated into the cooking apparatus once installed.

In some embodiments, a control circuit may be configured to generate an alert irrespective of whether the oven is powered on or powered off, i.e., whether or not the cooking element(s) of the oven are currently activated.

In some embodiments, generation and transmission of an alert by the control circuit may be performed using a sensor, the control circuit, and a user interface. However, for cost effectiveness, other embodiments may only include some of these components, such as a sensor and the control circuit. In addition, while the control circuit may incorporate a controller, processor, microcontroller, or other programmable component capable of executing instructions, and thus implementing at least a portion of the functionality discussed herein in software, in other embodiments a control circuit may include only fixed logic, e.g., implemented with passive and/or active components. Further, the control circuit's generation of the alert may or may not modify the cooking state of the apparatus.

In order to detect movement of the door, at least one sensor may be used to sense metrics relating to movement of the oven door in relation to the housing of the cooking apparatus. There are a plurality of ways for determining door movement, including but not limited to use of angle and use of distance. The control circuit may be configured to generate the alert using practically any sensor capable of sensing door movement. In some embodiments a sensor may be configured to sense other measurements in addition to, or instead of, those relating to door movement. These other measurements can relate to factors such as temperature or pressure. The sensor used for determining metrics relating to the movement may use any means, such as electrical contacts, proximity detection, light detection, magnetic contacts, and weight measurements (among others) to sense whether the door has been moved. Other types of suitable sensors will be appreciated by those of ordinary skill having the benefit of the instant disclosure.

The control circuit may be configured to execute one or more functions relating to the operation of the alert. One function of the one or more functions may be to sense if a change in metric (whether that metric be relating to distance, temperature, etc.) has occurred. When a change of metric has been sensed the sensor, and the sensor provides the input to the control circuit, the control circuit may be configured to issue an alert that notifies users that the oven door has been moved. The control circuit may be configured to also control one or more other functions, such as incorporating a delay, transmitting additional data to the output device to be further transmitted, and any other functions that may be useful to the user.

The control circuit may be configured to generate the alert to be presented in a number of different ways. Some means of conveying an alert may include visual displays, audio speakers, haptic output motors, and any other means of conveying a signal to a user. As such, the control circuit's generation of the alert may include at least one or more of audio cues, visual cues, and haptic cues, and any other means of conveying a notification.

In some embodiments, the control circuit may be configured to include a delay associated with the generation of the alert. In some embodiments, the delay is incorporated in the time between the control circuit determining movement of the door and generation of the alert. This delay may be configured to operate for a preset period of time. In other embodiments, the delay is incorporated in the time after the control circuit has received a termination input and the termination of the alert. In other embodiments, the control circuit provides an alert regardless of whether the oven appliance is powered on or off. In other embodiments the control circuit is configurable to execute an alert only in response to the oven door going from closed to open, or from open to closed.

In some embodiments, the control circuit generates an alert by communicating an electronic message, and the alert is received by remote devices. This receipt of the alert by the remote devices may be through wireless or wired connection. This receipt may be received by remote devices, such as automated assistants, phones, or fire alarms. A device may respond to the cooking apparatus. The response by the device may cause one or more functions to be executed by the control circuit, e.g., in response to a command issued by the device to the cooking apparatus. The execution of these functions by the control circuit may serve to adjust the temperature or alert settings on the oven, among other possible functions.

Other features and modifications will be appreciated by those of ordinary skill having the benefit of the instant disclosure.

Figure 2:
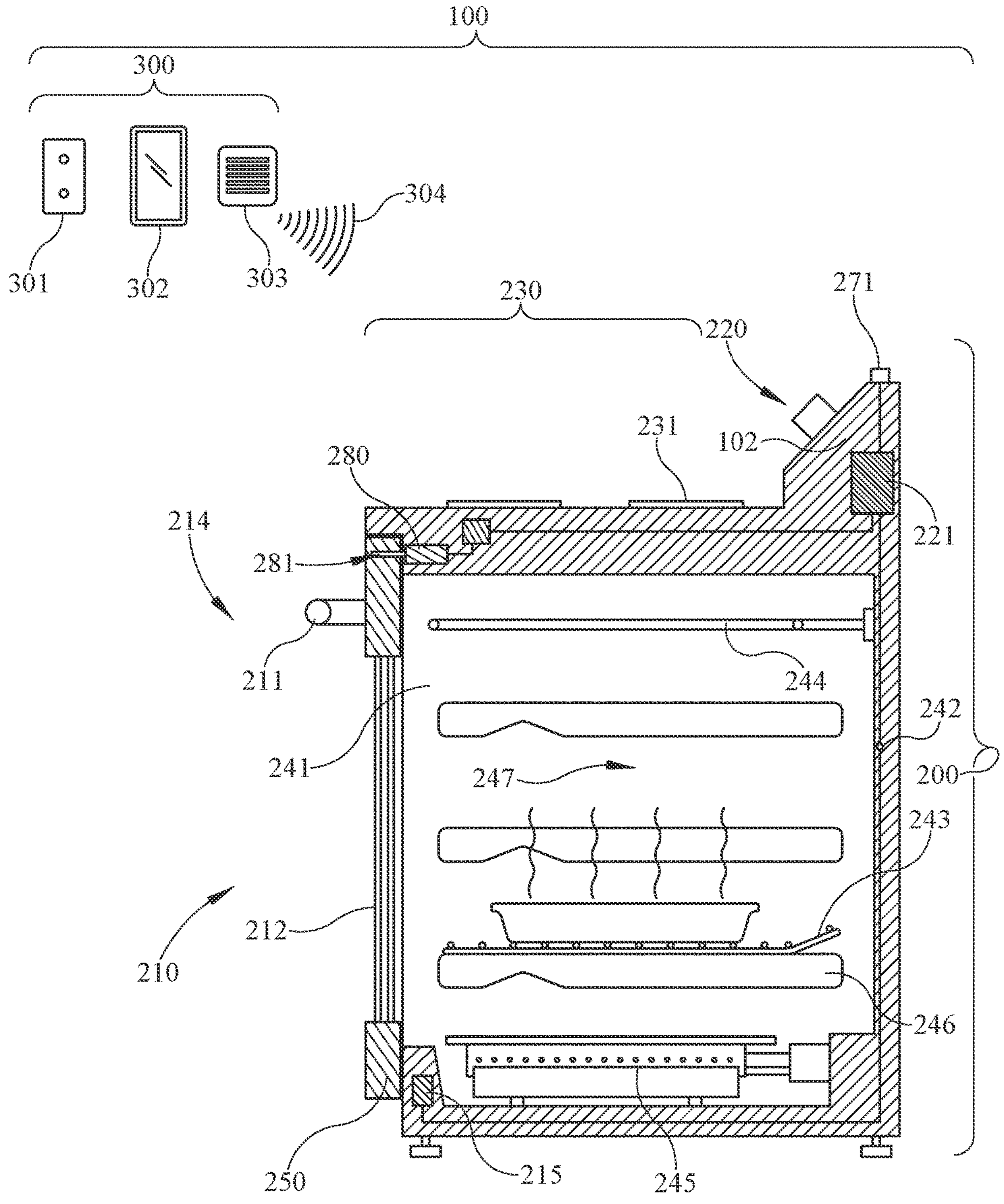
FIG. 2 is a cross sectional view of the cooking apparatus of FIG. 1 with the door closed.

Turning now to the drawings, wherein like numbers denote like parts throughout the several views, the overall configuration of a cooking apparatus within which the herein-described alert functionality may be utilized is shown in FIGS. 1-2. An appliance area 100 may include a cooking apparatus 200 that includes a door 210, a door handle 211, and a front panel 212. The door may be movable between an open position 213 (e.g., as shown in FIG. 1) and a closed position 214 (FIG. 2).

In the embodiment shown, the cooking apparatus 200 includes a user interface 220 and a control circuit 221 that drives the user interface. The user interface 220 may be electronic and may be used to both convey information to a user as well as receive user input from a user to operate the cooking apparatus. The user interface 220 may include controls, knobs, buttons, touchscreens, and any other apparatus capable of receiving user input. The control circuit 221, in response to user input received from the user interface 220 may be used to control a cooktop 230, including one or more cooking elements 231. Cooking utensils may also be located on one or more of the cooking elements 231. The user interface 220 may also be used to control an oven 240 of the cooking apparatus 200.

The oven 240 of the cooking apparatus 200 contains several elements in the illustrated embodiment, including one or more walls 241, a temperature sensor 242, one or more baking racks 243, a top heating element 244, a bottom heating element 245, and rails 246 for supporting the baking rack(s) 243. The oven 240 of the cooking apparatus 200 defines an oven cavity 247 that, during operation, is maintained at an elevated temperature through activation of one or both of heating elements 244, 245. Door 210 provides external access to oven cavity 247, and as illustrated is supported by a door hinge 250 that allows the door to pivot about a pivot point defined by a substantially horizontal axis that is substantially parallel to a front face of the cooking apparatus 200 proximate its bottom edge. It will be appreciated that door hinge 250 may provide for other forms of movement of door 210, e.g., with some translation in addition to rotation, with one or more stops within the range of movement of the door, and/or with damping, biasing, counterbalancing, etc., functionality to provide for smooth and reliable movement of the door within its range of movement, as will be appreciated by those of ordinary skill having the benefit of the instant disclosure.

Door 210 may also include a door sensor 215 to detect a position and/or movement of the door 210, and control circuit 221 may be coupled to the door sensor 215 for use in determining when to generate an alert when the door sensor 215 detects movement. The door switch 210 may be any switch capable of detecting a position and/or movement of a door, including plunger switch, proximity switch, and rocker switch.

As noted above, the cooking apparatus 200 includes a control circuit 221 that is configured to generate an alert in response to the door 210 being moved, at least in certain circumstances. The movement may be from a closed 214 to open position 213 or an open 213 to closed position 214 in some embodiments. The control circuit's 221 generation of the alert may include audio waves, visual cues, haptic outputs, or combinations thereof, along with any other relevant means of alert. When desired, the control circuit 221 may be programmed to turn the alert off. Additionally, when desired, the control circuit 221 may include a delay in the generation and/or termination of the alert. This allows a temporal gap between the moment the control circuit 221 receives input to generate the alert and the moment the control circuit generates the alert, so that users may respond to any temporary interference. For example, in some instances, it may be desirable to include a delay after detecting movement of a door away from a closed position until an alert is generated, such that, for example, if the door is only moved away from the closed position briefly and then returns immediately to the closed position, an alert will not be generated.

The control circuit 221 may generate an audible and/or visual alert on user interface 220 in some embodiments, or may generate an audible and/or visual alert on a separate device 271, which may include, for example, a speaker, a light, a message that can cause a remote device to generate a sound or other audible, visible and/or haptic cue when received, etc. The door sensor 215 may measure distance in which the door has travelled in some embodiments. In response to determining travel, the control circuit 221 may generate the alert. The control circuit 221 may also control aspects of the alert, such as the delay. In some embodiments, the control circuit 221 may generate the alert in part by communicating a message to a remote device 300 using one or more wired and/or wireless networks (e.g., represented at 304), and as such, may encode the alert with additional data so that the alert may be received and used by other devices 300. These other remote devices 300 may include an assistant device 301, mobile device 302, fire alarm 303, and any remote device capable of receiving the alert. The control circuit's 221 generation of the alert may be broadcast to a user and/or appear as a message presented on these other devices. The message may cause other devices 300 to generate a sound, a message, a visual notification in response to receiving the alert, and in some instances may cause a device to execute a function to perform various actions such as issuing a command to the cooking appliance to change its state.

With further reference to FIGS. 1 and 2, a lock 280 may be installed on the cooking apparatus 200 to prevent movement of the door 210 under certain circumstances, e.g., to prevent the door from opening when in a closed position. The lock 280 may be operated by the control circuit 221. This lock 280 may be in an engaged state 281 (e.g., as shown in FIG. 2) or a disengaged state 282 (e.g., as shown in FIG. 1). When the lock 280 is in an engaged state 281, the door 210 will not be free to move. When the lock 280 is in a disengaged state 282, the door 210 will be free to move. The lock 280 may be magnetic, electrical, mechanical, pneumatic, or any other suitable manner of securing the door 210 to preclude its movement away from a closed position. The control circuit 221 may also generate an alert in response to operation of a lock 280.

Figure 3:
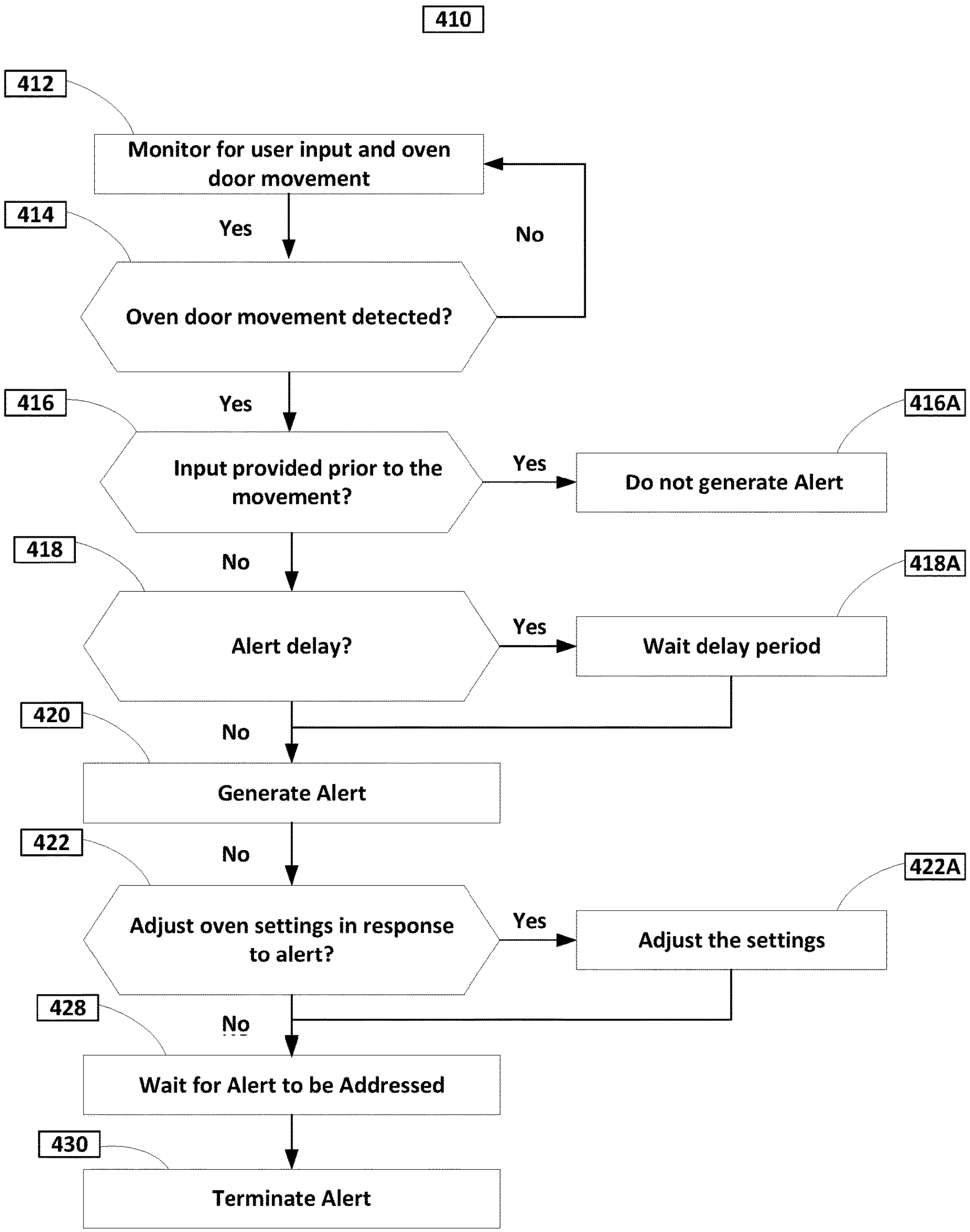
FIG. 3 is a flow chart of an example method of operating the cooking apparatus of FIGS. 1-2, according to one embodiment.

The flow chart of FIG. 3, along with FIGS. 1 and 2, illustrate an example method for generating the alert for some embodiments of the invention. It is assumed, in FIG. 3, that movement of the door, without user input being provided prior to the movement, will initiate the sequence of operations leading up to, including, and following, the generation of the alert. Thus, for example, it may be desirable in some embodiments to instruct a user to interact with the cooking apparatus in some manner (e.g., touching a dedicated button, turning a knob, setting a cooking temperature for the oven, or practically any other intentional user interaction through the user interface) prior to opening the oven door to avoid generating an alert. By doing so, an intentional opening of an oven door, which often occurs only after the user has turned on the oven to start the heating process, may not generate an alert, whereas an unintentional opening of the oven door, or an opening of the oven door by a child or pet without first interacting with the user interface, may cause an alert to be generated.

First, in block 412, a sensor monitors for door movement and a user interface monitors for user input.

Next, in block 414, it is determined if movement is either detected or undetected. If movement is undetected, control passes to block 412 to continue to monitor. If movement is detected, control passes to block 416 to determine if user input was provided to the user interface prior to the movement of the door, and in some instances, a particular type of input such as a particular button, control, etc. that a user is required to interact with in order to avoid generating an alert when the door is opened. In other instances, however, any user input may be sufficient, if received within a predetermined period of time, to avoid generating the alert. Thus, if suitable user input was provided to the user interface prior to the movement of the door, then control passes to block 416A to not generate an alert.

Returning to block 416, if user input was not provided to the user interface prior to the movement of the door, then control passes to block 418 to determine if an alert delay is being used. A delay is useful for a variety of purposes, including averting alerts when the door is opened and closed too quickly to justify an alert, or allowing a user time to move the door and prepare to terminate the alert without having the alert issuing immediately upon movement of the door. If an alert delay is being used, then control passes to block 418A to determine the amount of time to wait for the delay and wait that amount of time prior to passing control to block 420 to generate the alert. In some embodiments, the delay may be fixed in the control circuit. In other embodiments, the delay may be configurable by the user. In some embodiments, no delay may be used, and block 418 and 418A may be omitted from the operation sequence.

Returning to block 418, if an alert delay is not being used, block 418A is bypassed and control passes directly to block 420 to generate the alert. The lack of an alert delay may be useful for allowing members of a household to be reactive to any movements of the oven door within a short amount of time. The alert may include at least one or more of audible, visual, communication output, and/or haptic output, and any other output, and any combination thereof.

Next, in block 422, the control circuit determines if settings are to be adjusted in response to the generation of the alert. The adjustment of settings in response to an alert may prevent the heating elements from continuing to generate heat if the alert issues and nobody is around to address the alert in a short amount of time, reducing unnecessary power consumption and risk of fire hazard. The adjustment of settings in response to an alert may also adjust the state of locks, preventing oven door locks from engaging on a recently closed door until the alert is addressed, reducing the risk of entrapment. Adjustment of the settings may be a result of an automatic response by the control circuit, or a manual response from a user or user assistant. If settings are to be adjusted, then control passes to block 422A to adjust the settings. The settings adjusted may include the state of locks, the operational state of the cooking apparatus, temperature, and any other adjustable feature of the oven, and any combination thereof.

After adjusting the settings in block 422A, or if block 422 determines that no command has been received, control passes to block 428 to wait for the alert to be addressed. The alert may be addressed in a variety of ways by a variety of users. Addressal may include closing the door, interacting with the user interface, and/or interacting with a remote device which may interact with the user interface, and any other means of addressal, and any combination thereof. In addition, in some embodiments, the control circuit may be programmed to address the alert automatically if the alert has been issued for a certain duration without user or user assistant addressal. Addressal by the control circuit may include using sensor data to determine, for example, when the oven door has been closed, when the user has interacted with the user interface, when a command has been received from a remote device, etc. Findings by the control circuit may be sent as data in the alert that is receivable by remote devices.

Next, in block 430, the alert is terminated. Termination of the alert may cease the visual, communicative, haptic, and/or audio cues generated for the alert. Termination of the alert may cause the control circuit to communicate data to a remote device to notify that device that the alert has been terminated. Termination of the alert may also have results in other manners that will be apparent to those of ordinary skill having the benefit of the instant disclosure.

Figure 4:
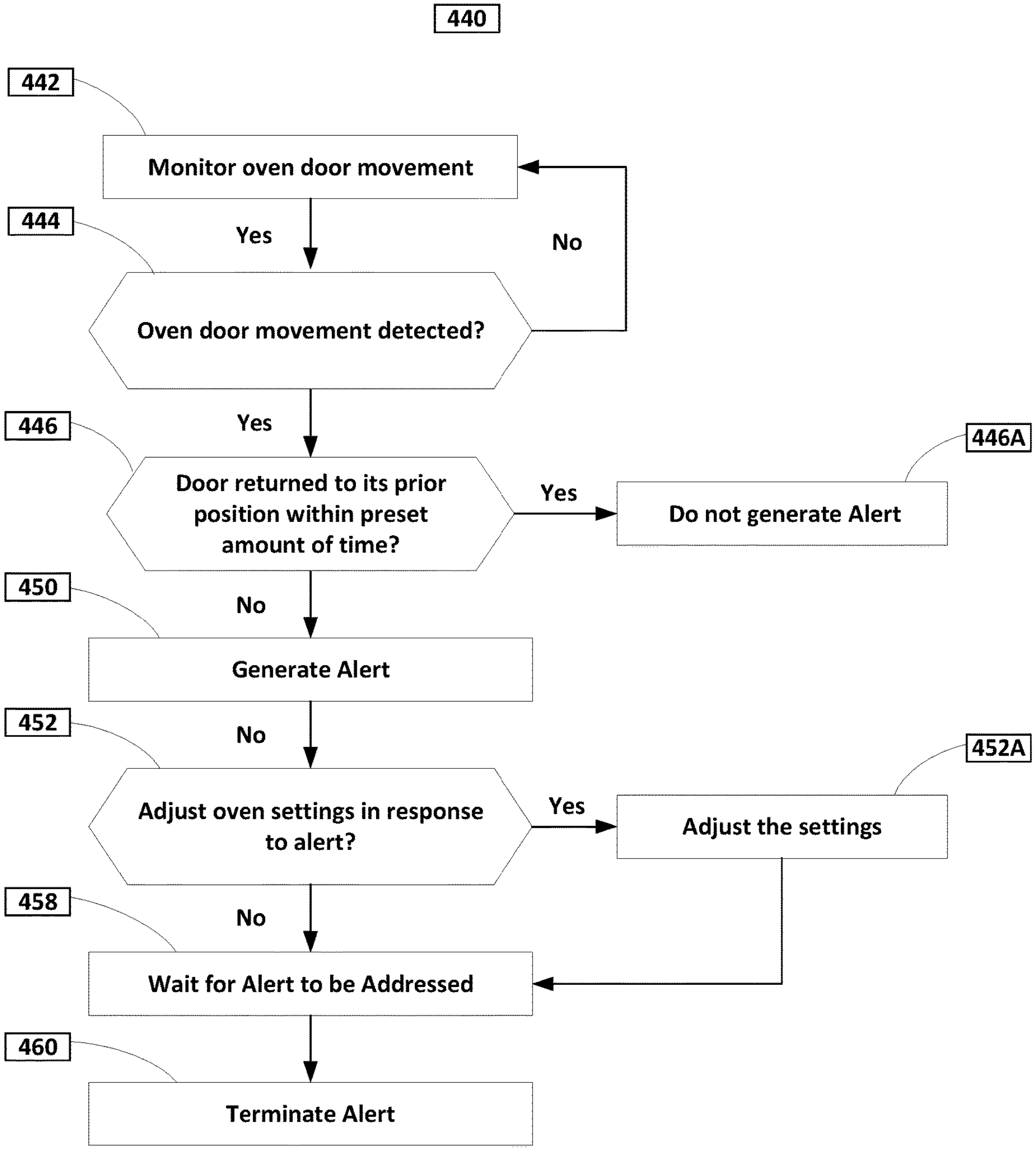
FIG. 4 is a flow chart of another example method of operating the cooking apparatus of FIGS. 1-2, according to another embodiment.

The flow chart of FIG. 4 along with FIGS. 1 and 2, illustrate yet another example method for generating the alert. It is assumed, in FIG. 4, that movement of the door without return to the original position within a preset amount of time will initiate the sequence of blocks leading up to, including, and following, the generation of the alert.

The flow chart begins with blocks 442 and 444 which are similar to blocks 412 and 414, in that they monitor for oven door movement and detect oven door movement, respectively. However, it is generally not necessary to this method that the user interface be monitored as is performed in the operational sequence of FIG. 3.

When oven door movement is detected (e.g., movement away from the closed position), block 444 passes control to block 446 to wait for the door to be returned to its prior position (e.g., the closed position), and to determine whether the oven door has returned to its prior position within a preset amount of time after the initial detection. In some instances, for example, a timer may be started when the oven door movement is initially detected, such that if the timer reaches the preset amount of time prior to detecting the return of the oven door to its prior position, control may pass to block 446A to avoid generating the alert.

If, however, the timer does reach the preset amount of time prior to detecting the return of the oven door to its prior position, block 446 may pass control to block 450 to generate an alert. Thus, a delay may be considered inherent in block 446, in that the generation of an alert will be postponed by the preset amount of time, and if the door returns to its prior position within that amount of time, the alert will not be generated. The amount of time that elapses between a detection of movement and generation of an alert may be fixed by the control circuit or configurable by the user. The delay may be of such a minute duration so as to be unrecognizable by a human, but recognizable by an automated assistant or electronic device, or may be longer. The position to which the door must return to avoid generation of the alert may be within a fixed accuracy, or an accuracy that is configurable by the user, allowing for deviations in the returned position from the prior position to satisfy the criteria for not generating an alert.

Block 450 may generate any of the various types of alerts as discussed above in connection with block 420 in FIG. 3. Thereafter, block 452 may selectively pass control to block 452A to adjust one or more oven settings if desired, similar to 422 and 422A of FIG. 3, and the control circuit may thereafter wait for the alert to be addressed in block 458, similar to block 428 of FIG. 3. Then, once the alert is addressed, control may pass to block 460 to terminate the alert, in a similar manner to that discussed above in connection with block 430 of FIG. 3.

In some embodiments it may be desirable to generate an audible alert anytime a door is moved. In some embodiments the alert may issue only when the door moves from a predefined position, such as the closed position. In other embodiments, an alert may issue during movement of the door and cease after movement has stopped. As with FIGS. 3 and 4, the alert may have a delay, and may cause settings of the oven to be adjusted.

In addition, in some embodiments, additional actions may be performed in connection with generating an alert, including actions taken at a later point in time. For example, if an alert sounds for a predetermined period of time without being addressed, it may be desirable to shut down any active cooking modes automatically. In addition, it may be desirable in some embodiments to allow a remote device to command a cooking apparatus to shut down any active cooking modes after receiving an alert. As one example, where the remote device is a mobile device, a user may be presented with an option to shut down any active cooking modes after the alert is received by the mobile device and presented to the user.

As discussed previously, multiple embodiments of the cooking apparatus 200 and method of operating it 400 are possible. As but one example of an alternative embodiment, the cooktop 230 may be omitted and, instead of or in addition to, cooking elements 244 and 245, microwave technology may be used.

The disclosed cooking apparatus 200 may be a variety of constructions, shapes, sizes, quantities, and positions and still accomplish the same intent. The elements depicted in the figures may not be drawn to scale and thus, the elements may have different sizes and/or configurations other than as shown in the figures.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms “connected,” “coupled,” “in communication with,” and “mounted,” and variations thereof herein are used broadly and encompass direct and indirect connections, couplings, and mountings. In addition, the terms “connected” and “coupled” and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. A cooking apparatus, comprising:
- a housing;
- an oven cavity disposed within the housing;
- one or more cooking elements configured to heat the oven cavity;
- a door coupled to the housing, wherein the door is movable from a closed position to an open position to provide external access to the oven cavity;
- a sensor configured to sense movement of the door in relation to the housing;
- a user interface configured to receive user input; and
- a control circuit coupled to the sensor and the user interface, the control circuit configured to process user input received by the user interface and to detect movement of the door with the sensor, the control circuit further configured to immediately generate an alert in response to detecting movement of the door with the sensor prior to receiving user input through the user interface and configured to not generate the alert in response to detecting movement of the door with the sensor when user input is received prior to detecting the movement of the door.

2. The cooking apparatus of claim 1, wherein the control circuit is configured to generate the alert without modifying a cooking state of the cooking apparatus.

3. The cooking apparatus of claim 1, wherein the control circuit is configured to modify a cooking state of the cooking apparatus in connection with generating the alert.

4. The cooking apparatus of claim 1, wherein the control circuit is configured to generate the alert irrespective of whether the one or more cooking elements are powered on or powered off.

5. The cooking apparatus of claim 1, wherein the control circuit is configured to communicate the alert to a remote device.

6. The cooking apparatus of claim 5, wherein the remote device is a mobile device and the alert is a message presented on the mobile device.

7. The cooking apparatus of claim 5, wherein the remote device is an assistant device, and the alert causes the assistant device to broadcast a message to a user.

8. The cooking apparatus of claim 5, wherein the alert causes the remote device to communicate a command to the cooking apparatus.

9. The cooking apparatus of claim 1, wherein the control circuit is configured to terminate the alert in response to detecting closing of the door with the sensor.

10. The cooking apparatus of claim 1, wherein the alert is an audible alert.

11. A cooking apparatus, comprising:
- a housing;
- an oven cavity disposed within the housing;
- one or more cooking elements configured to heat the oven cavity;
- a door coupled to the housing, wherein the door is movable from a closed position to an open position to provide external access to the oven cavity;
- a sensor configured to sense movement of the door in relation to the housing; and
- a control circuit coupled to the sensor, the control circuit configured to detect movement of the door with the sensor, the control circuit further configured to generate an alert in response to detecting movement of the door away from the closed position, without returning to the closed position within a preset period of time, with the sensor, wherein the control circuit is configured to communicate the alert to a remote device, and the alert causes the remote device to communicate a command to the cooking apparatus.

12. The cooking apparatus of claim 11, wherein the control circuit is configured to generate the alert without modifying a cooking state of the cooking apparatus.

13. The cooking apparatus of claim 11, wherein the control circuit is configured to modify a cooking state of the cooking apparatus in connection with generating the alert.

14. The cooking apparatus of claim 11, wherein the control circuit is configured to generate the alert irrespective of whether the one or more cooking elements are powered on or powered off.

15. The cooking apparatus of claim 11, wherein the remote device is a mobile device and the alert is a message presented on the mobile device.

16. The cooking apparatus of claim 11, wherein the remote device is an assistant device, and the alert causes the assistant device to broadcast a message to a user.

17. The cooking apparatus of claim 11, further comprising: a user interface configured to receive user input, the user interface being coupled to the control circuit and the sensor, wherein the control circuit is further configured to process user input received by the user interface and to provide the alert in response to detecting movement prior to receiving user input from the user interface.

18. The cooking apparatus of claim 11, wherein the alert is an audible alert.

19. A cooking apparatus, comprising:

a housing;

an oven cavity disposed within the housing;

one or more cooking elements configured to heat the oven cavity;

a door coupled to the housing, wherein the door is movable from a closed position to an open position to provide external access to the oven cavity;

a sensor configured to sense movement of the door in relation to the housing;

a user interface configured to receive user input; and a control circuit coupled to the sensor and the user interface, the control circuit configured to process user input received by the user interface and to detect movement of the door with the sensor, the control circuit further configured to generate an alert in response to detecting movement of the door with the sensor prior to receiving user input through the user interface, wherein the control circuit is configured to communicate the alert to a remote device, and the alert causes the remote device to communicate a command to the cooking apparatus.

* * * * *